(12) United States Patent
Hikichi

(10) Patent No.: US 8,549,228 B2
(45) Date of Patent: Oct. 1, 2013

(54) PROCESSOR AND METHOD OF CONTROL OF PROCESSOR

(75) Inventor: Toru Hikichi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 406 days.

(21) Appl. No.: 12/959,968

(22) Filed: Dec. 3, 2010

(65) Prior Publication Data

US 2011/0138130 A1 Jun. 9, 2011

(30) Foreign Application Priority Data

Dec. 9, 2009 (JP) ................................ 2009-279716

(51) Int. Cl.
*G06F 12/12* (2006.01)
(52) U.S. Cl.
USPC ......................................................... 711/133
(58) Field of Classification Search
None
See application file for complete search history.

(56) References Cited

U.S. PATENT DOCUMENTS

| 7,007,136 | B2 | 2/2006 | Yokoi et al. | |
|---|---|---|---|---|
| 2003/0009622 | A1 | 1/2003 | Gaskins et al. | |
| 2006/0026366 | A1* | 2/2006 | Yoshizawa et al. | 711/137 |
| 2007/0186073 | A1 | 8/2007 | Luick | |

FOREIGN PATENT DOCUMENTS

| JP | 2004-38298 A | 2/2004 |
|---|---|---|
| JP | 2007-272681 A | 10/2007 |

OTHER PUBLICATIONS

Extended European Search Report mailed Jul. 4, 2011 for corresponding European Application No. 10193032.9.

* cited by examiner

*Primary Examiner* — Duc Doan

(74) *Attorney, Agent, or Firm* — Fujitsu Patent Center

(57) ABSTRACT

A processor includes: a processing unit that has a first unit; a second unit that holds part of the data held by the first unit; a third unit that receives from the processing unit a first request including first attribute information for obtaining a first logical value and a second request including second attribute information for obtaining a second logical value and that holds the first request until receiving a completion notification of the first request or holds the second request until receiving a completion notification of the second request; and a control unit that receives the first and second requests from the third unit and, replaces the first attribute information by the second attribute information when data of the addresses corresponding to the first and second request are not in the second unit, and supplies the completion notification for the second request to the first unit.

4 Claims, 13 Drawing Sheets

FIG.5B

| Valid | hld_flg | req_issued | rpl_cplt | ms_cplt | mvin_rdy | PA | CODE | PF | sector_ID | L1_MIBID | CORE_ID | L2_WAY_ID |
|---|---|---|---|---|---|---|---|---|---|---|---|---|
| Valid_0 | hld_flg_0 | req_issue0 | rpl_cplt_0 | ms_cplt_0 | mvin_rdy_0 | PA0 | code_0 | PF_0 | sec_ID_0 | L1_MIBID_0 | CORE_ID_0 | L2_WAYID_0 |
| ----- | ----- | ----- | ----- | ----- | ----- | ----- | ----- | ----- | ----- | ----- | ----- | ----- |
| Valid_5 | hld_flg_5 | req_issue5 | rpl_cplt_5 | ms_cplt_5 | mvin_rdy_5 | PA5 | code_5 | PF_5 | sec_ID_5 | L1_MIBID_5 | CORE_ID_5 | L2_WAYID_5 |
| Valid_6 | hld_flg_6 | req_issue6 | rpl_cplt_6 | ms_cplt_6 | mvin_rdy_6 | PA6 | code_6 | PF_6 | sec_ID_6 | L1_MIBID_6 | CORE_ID_6 | L2_WAYID_6 |
| Valid_7 | hld_flg_7 | req_issue7 | rpl_cplt_7 | ms_cplt_7 | mvin_rdy_7 | PA7 | code_7 | PF_7 | sec_ID_7 | L1_MIBID_7 | CORE_ID_7 | L2_WAYID_7 |

160-3

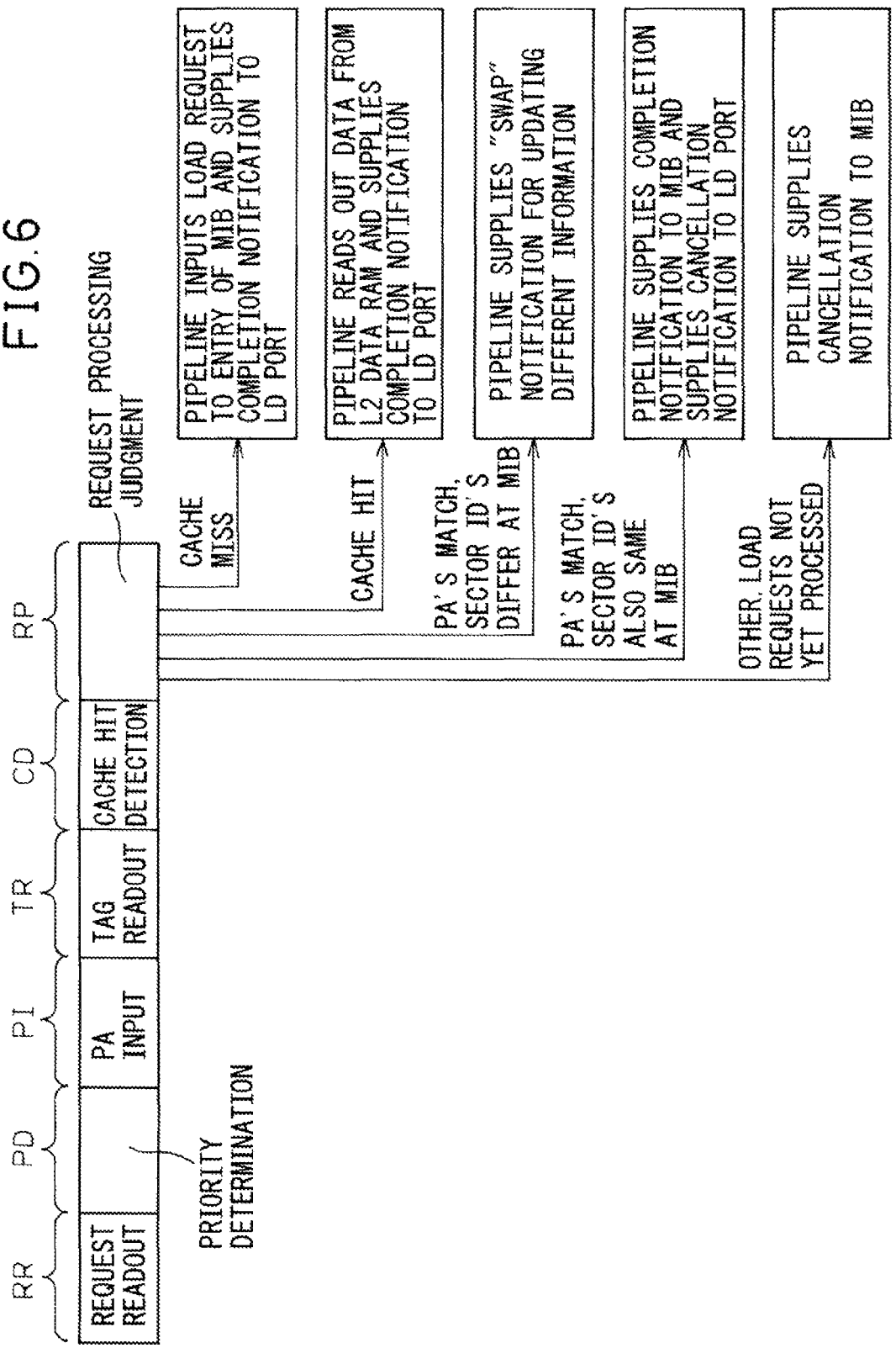

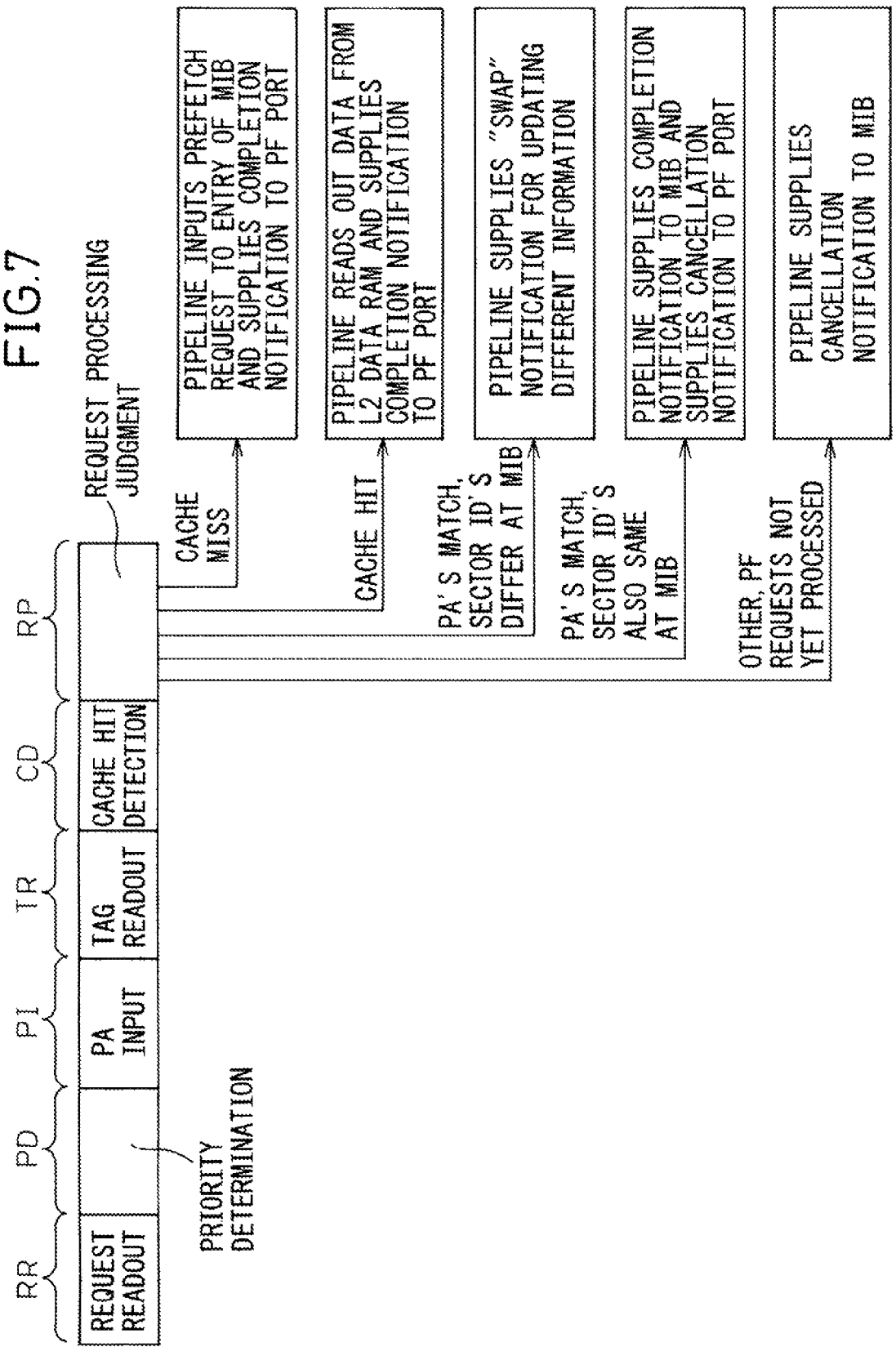

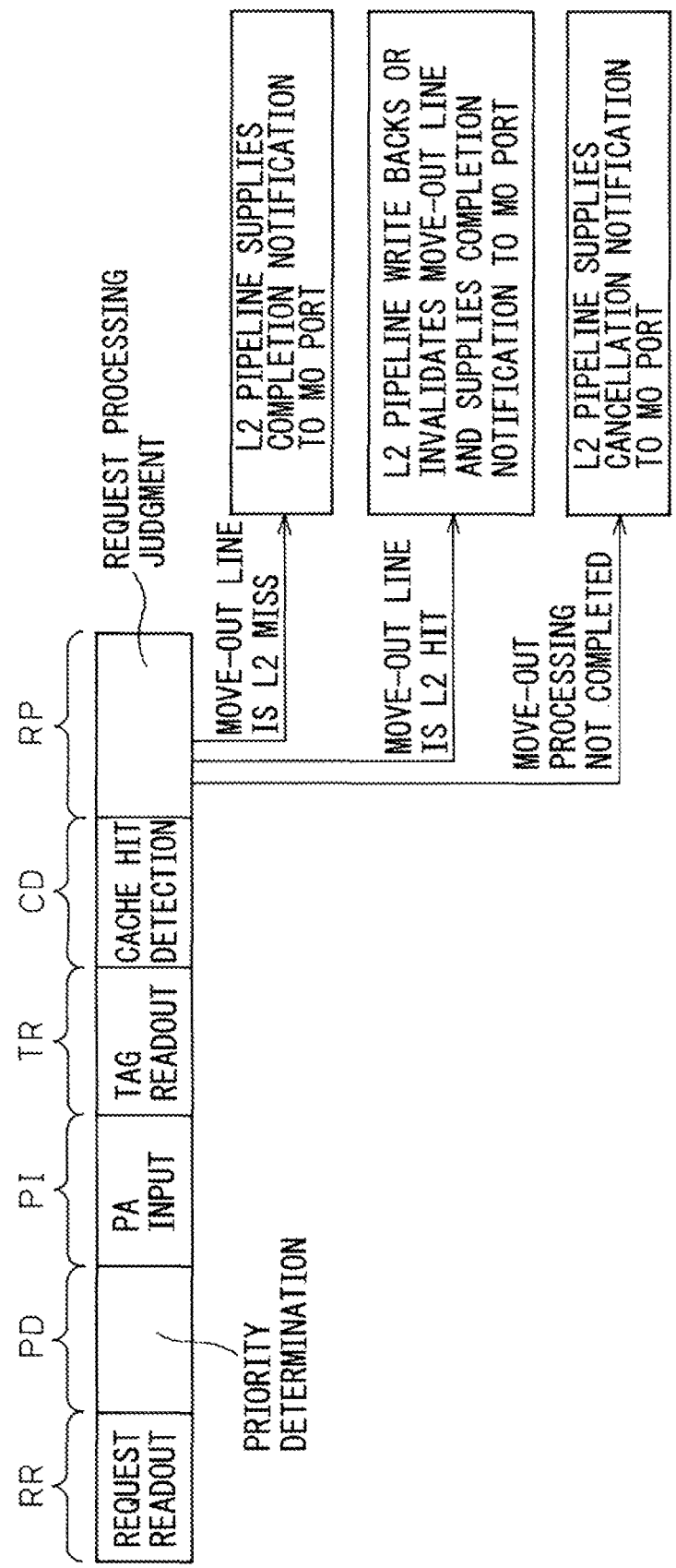

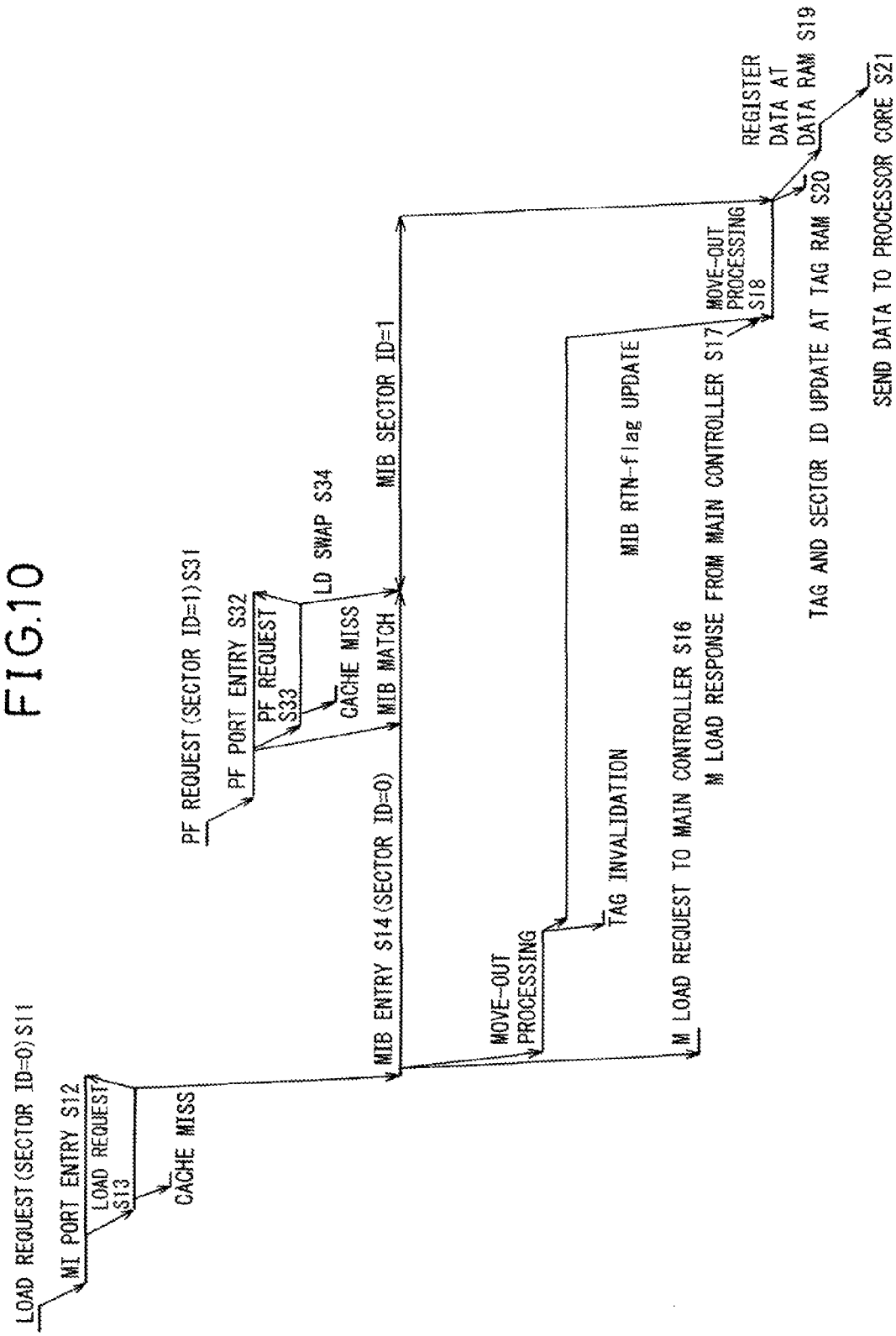

FIG.11B

723
PF COMPLETION →

| way=0 | way=1 | way=2 | way=3 | way=4 | way=5 | way=6 | way=7 |
|---|---|---|---|---|---|---|---|
| X (secid=0) | B (secid=1) | C (secid=1) | D (secid=1) | E (secid=1) | F (secid=1) | G (secid=1) | H (secid=1) |

733 — LRU : B < C < D < E < F < G < H < X

724

| way=0 | way=1 | way=2 | way=3 | way=4 | way=5 | way=6 | way=7 |
|---|---|---|---|---|---|---|---|
| Y (secid=0) | B (secid=1) | C (secid=1) | D (secid=1) | E (secid=1) | F (secid=1) | G (secid=1) | H (secid=1) |

734 — LRU : B < C < D < E < F < G < H < Y

725

| way=0 | way=1 | way=2 | way=3 | way=4 | way=5 | way=6 | way=7 |
|---|---|---|---|---|---|---|---|
| Y (secid=0) | B (secid=1) | C (secid=1) | D (secid=1) | E (secid=1) | F (secid=1) | G (secid=1) | H (secid=1) |

735 — LRU : B < C < D < E < F < G < H < Y

FIG.12

| PRECEDING REQUEST | SUCCEEDING REQUEST | SWAP POSSIBLE | MIB ENTRY AFTER SWAP |
|---|---|---|---|
| PF | PF | POSSIBLE | PF |
| PF | DM | POSSIBLE | DM |
| DM | PF | POSSIBLE | DM |
| DM | DM | NOT POSSIBLE | — |

PROCESSOR AND METHOD OF CONTROL OF PROCESSOR

CROSS-REFERENCE TO RELATED APPLICATION

This application is based upon and claims the benefit of priority of the prior Japanese Patent Application No. 2009-279716, filed on Dec. 9, 2009, the entire contents of which are incorporated herein by reference.

FIELD

The embodiments discussed herein relate to a processor and a method of control of a processor.

BACKGROUND

Due to the recent improvements in operating frequencies of processors, the access time from a processor to a memory has become longer relative to the processor operating frequency. For this reason, processors are now being equipped with small capacity and high speed memories called "cache memories" for shortening the access time from the processors to main storage devices. Here, as "processor", there is CPU (central processing unit), DSP (digital signal processor), GPU (graphics processing unit), etc.

A cache memory is positioned at a higher hierarchy from the main storage device and holds part of the data stored by the main storage device. When a processor accesses data loaded in the cache memory (hereinafter referred to as a "cache hit"), since the cache memory is built into the processor or otherwise at a position closer to the processor than the main storage device, the processor can access the data concerned in a shorter time. On the other hand, when a processor accesses data not loaded in the cache memory (hereinafter referred to as a "cache miss"), it has to read out the data from a memory positioned at a lower level from the cache memory, so the access time to the data concerned becomes longer. For this reason, to prevent a cache miss from occurring, the memory controller of the cache memory operates to hold data with a high frequency of access from the processor in the cache memory and to expel data with a low frequency of access to a lower level memory.

As an algorithm for expelling data with a long period of nonuse on a priority basis to a lower level memory, the "Least Recently Used (LRU)" algorithm is known. The LRU is an algorithm for expelling data with the longest period of nonuse in the data held to a lower level memory when there is no longer empty space in the cache memory.

The LRU, for example, stores data illustrating the time of use for each entry of the cache memory. Each time an entry is used, it updates the data. At the time when an entry is updated, it checks the timings for all entries and judges "the least used entry". However, the LRU takes time for performing the processing for checking the times of use for all entries. In particular, in a set associative type cache memory which divides the cache memory into "ways" and gives a plurality of tag addresses to a single index, the cache line concerned is determined by multiplication of the index and ways, so the check processing takes further time.

To simply judge unused data, the method has been proposed of judging the type of instruction supplied from the processor so as to determine data with a high frequency of access by the processor. When the instruction executed by the processor is a memory access instruction, the data fetched by the memory access instruction is managed by state information illustrating that the possibility of it being subsequently referred to is high. Further, when the result of processing by an instruction executed by the processor is registered in a cache line, the registered data is managed by state information illustrating that the possibility of it being subsequently referred to is low.

The technique is known of moving out data held in a cache memory and with a low frequency of access by a processor to a lower level memory.

[Patent Document 1] Japanese Laid-open Patent Publication No. 2004-038298
[Patent Document 2] Japanese Laid-open Patent Publication No. 2007-272681

SUMMARY

According to an aspect of the embodiment, a processor includes: a processing unit that has a first storage unit; a second storage unit that holds part of the data held by the first storage unit; a third storage unit that receives from the processing unit a first request for reading out data from the second storage unit and including first attribute information for obtaining a first logical value and a second request for reading out data from the second storage unit and including second attribute information for obtaining a second logical value different from the first logical value and that holds the first request until receiving a completion notification of the first request or holds the second request until receiving a completion notification of the second request; and a control unit that receives the first and second requests from the third storage unit and, replaces the first attribute information of the first request by the second attribute information when data of the addresses corresponding to the first and second request are not in the second storage unit, and supplies the completion notification for the second request to the first storage unit.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

These and other objects and features will become clearer from the following description of the preferred embodiments given with reference to the attached drawings, wherein:

FIG. 5B is a data structure diagram illustrating an example of an MIB;

FIG. 6 is a flow diagram illustrating an example of pipeline processing;

FIG. 7 is a flow diagram illustrating an example of pipeline processing;

FIG. 8 is a flow diagram illustrating an example of pipeline processing;

FIG. 10 is a time chart of processing in the case of a processor core issuing a load request and prefetch request to the same address;

FIG. 11B is a diagram illustrating, for each way, the state of a cache line on which sector ID move-out processing is performed; and FIG. 12 is a diagram illustrating an example of the possibility of a swap in the case where a plurality of requests are issued for the same address.

DESCRIPTION OF EMBODIMENTS

As described previously, a processor sometimes add attribute information specifying if a line registering data read out by a load request or prefetch request is to be moved out. Furthermore, a processor sometimes continuously outputs a load request to which attribute information is added and a prefetch request to which attribute information different from the attribute information added to the load request is added and for the same address as the load request. In such a case, data is read out from a lower level memory by a preceding load request, so the memory controller operates to suspend a succeeding prefetch instruction once, fetch data from the memory by the load request, then update the cache line by the attribute information added to the succeeding prefetch request.

However, while the memory controller is suspending a prefetch instruction and supplying a response signal to the processor, the buffer circuit between the processor and the cache memory is occupied, so the processor cannot supply a data access request to the cache memory.

Figure 1:
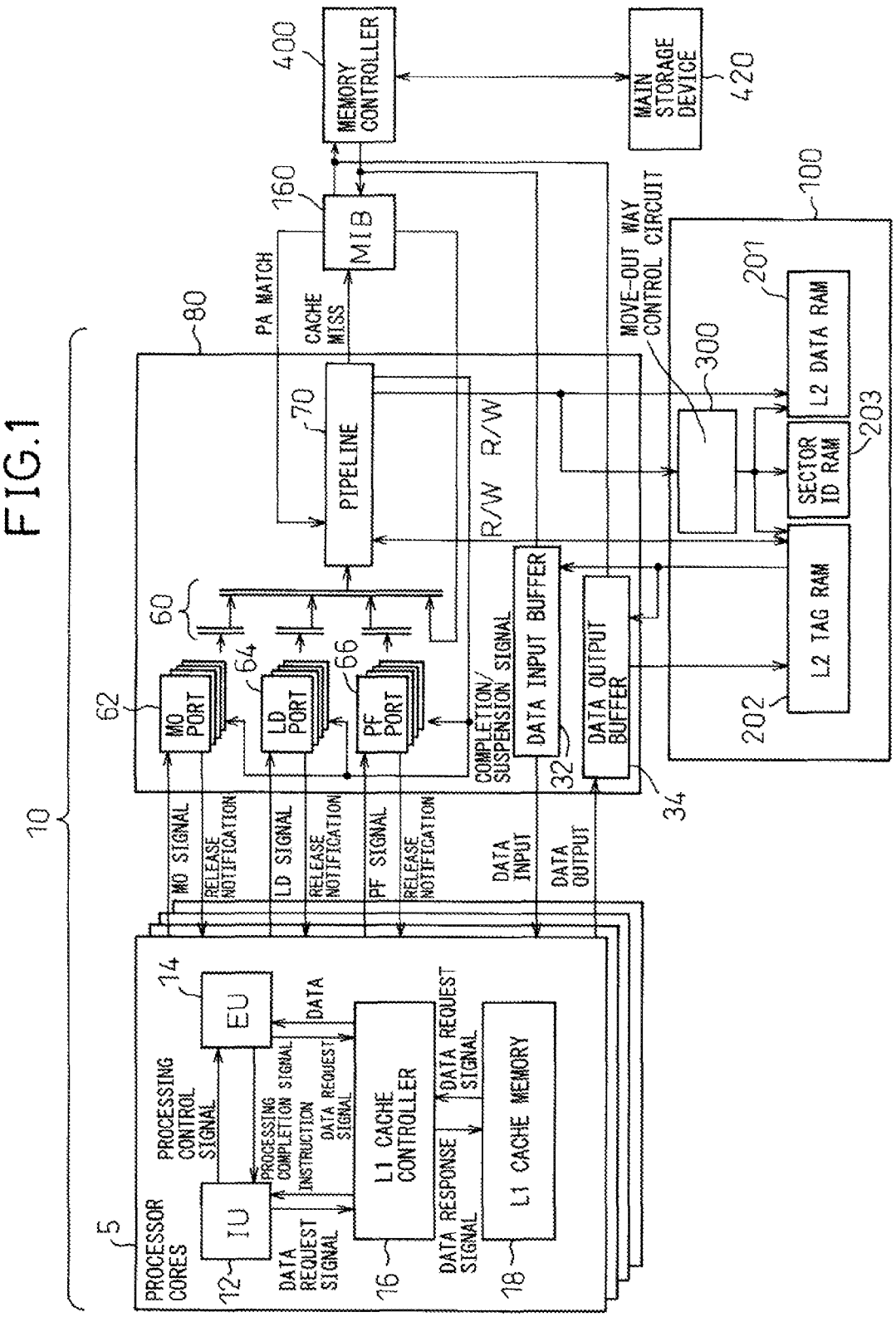
FIG. 1 is a block diagram illustrating an example of the configuration of a processor.

Below, an embodiment of a processor used in a processing system will be explained with reference to the drawings. FIG. 1 is a block diagram illustrating an example of the configuration of a processor. The processor 10 of FIG. 11 has a processing unit comprised of a processor core 5, an L2 cache controller (level 2 cache controller) 80, an L2 tag RAM (level 2 tag random access memory) 201, an L2 data RAM (level 2 data random access memory) 202, a sector ID RAM 203, a move-out way control circuit 300, and move-in buffer (MIB) 160. The processor 10 is connected through a memory controller 400 to a main storage device 420.

The processor core 5 has an instruction unit (IU) 12, an execution unit (EU) 14, an L1 cache controller (level 2 cache controller) 16, and an L1 cache memory (level 1 cache memory) 18. Note that, the processor 10 may also be a multicore processor mounting a plurality of processor cores. When the processor 10 is a multicore processor, processor cores other than the processor core 5 may also perform processing similar to the processor core 5.

The instruction unit 12 supplies a data request signal to the L1 cache controller 16 to obtain data. When a cache hit occurs at the L1 cache memory 18, an instruction is supplied from the L1 cache memory 18 to the instruction unit 12. Further, when a cache miss occurs at the L1 cache memory 18, the L1 cache controller 16 issues a load request to an LD port (load port) 64 or a prefetch request to a PF port (prefetch port) 66. Note that, a "prefetch request" is a request by the requesting processor core 5 to register data, which it expects may be necessary, in advance from the main storage device into the L2 cache memory 100.

An instruction read out from the L1 cache memory 18 is decoded and the decoded instruction and register address are supplied as a "processing control signal" to the execution unit 14. The decoded instruction is, for example, a load instruction, store instruction, or prefetch instruction to the L1 cache memory 18. Note that, these instructions include sectors IDs defined for control of the move-out state of the data. A sector ID will be explained later using FIG. 3. The instruction unit 12 supplies the data request signal to the L1 cache controller 16 to read out the instruction from the L1 cache memory 18.

The execution unit 14 takes out data from the register specified by the register address at the inside of the execution unit 14 and performs processing in accordance with the decoded instruction. The execution unit 14, in accordance with the decoded instruction, supplies a "data request signal" comprised of the load request, store request, or prefetch request to the L1 cache controller 16. The L1 cache controller 16 supplies data to the execution unit 14 in accordance with the load instruction. The execution unit 14, when finishing executing the instruction, supplies a processing completion signal to the instruction unit 12 so as to obtain the next processing control signal.

The L1 cache memory 18, while not illustrated, includes a translation lookaside buffer (TLB), an L1 tag RAM, and an L1 data RAM. Further, the L1 cache controller 16 specifies a cache line by a virtual address, compares the physical addresses read out from the TLB and the cache line of the L1 tag RAM, and thereby judges a cache miss or hit of the L1 cache memory 18.

The L2 cache controller 80 has an MO port (move-out port) 62, LD port 64, PF port 66, priority control circuit 60, pipeline 70, data input buffer 32, and data output buffer 34.

The MO port 62, LD port 64, and PF port 66 are provided corresponding to each processor core. The MO port 62, LD port 64, and PF port 66 respectively temporarily hold a L2 cache memory move-out request (MO request), load request (LD request), and prefetch request (PF request) and request the pipeline 70 perform processing. The MO port 62, LD port 64, and PF port 66 notify the L1 cache controller 16 that they are open when the pipeline 70 completes the pipeline processing.

The MO port 62, LD port 64, and PF port 66, to prevent overflow of requests from the processor core 5, have resource counters which add 1 (+1) to (increment) the current point value with each request notification and subtract 1 (−1) from (decrement) the current pointer value with each open notification and limit issuance of requests so that the resource counters do not exceed the number of entries. Examples of the LD port 64 and PF port 66 will be explained later using FIG. 4.

The priority control circuit 60 receives requests from the MO port 62, LD port 64, and PF port 66 and inputs the requests to the pipeline 70 in accordance with a predetermined priority order.

The pipeline 70 requests access to data in the L2 cache memory 100 and controls the various resources. When a cache miss occurs at the L2 cache memory 100, the pipeline 70 inputs the load request or prefetch request received from the LD port 64 or PF port 66 to the MIB 160. The pipeline 70 supplies a completion signal illustrating that the processing by the pipeline has been completed or a suspension signal illustrating that the processing has been suspended to the MO port 62, LD port 64, and PF port 66. Note that, one example of the processing of the pipeline will be explained later using FIGS. 5 to 7.

When receiving a load request or prefetch request from the pipeline 70, the MIB 160 obtains data from the main storage device 420 by issuance of a load request for the data concerned to the memory controller 400. Below, a load request to the memory controller 400 will be called an "Mload request". After this, the MIB 160 waits for a data response from the memory controller 400.

Further, the MIB 160 temporarily holds the attribute information (address etc.) of the data for which it issues an Mload request to the memory controller 400 due to a cache miss. An example of the MIB 160 will be explained later using FIG. 8.

When a cache hit is detected at the L2 cache memory 100, the data input buffer 32 receives the data read out from the L2 data RAM 202 and supplies it to the processor core 5. Further, the data input buffer 32 supplies the data read out from the main storage device 420 due to the Mload request to the processor core. The data output buffer 34 receives the data from the processor core 5 and writes it in the L2 data RAM 202 or main storage device 420.

The case where the LD port 64 receives a load request by the above configuration will be explained. The LD port 64 inputs the load request in the pipeline 70. The pipeline 70 searches for the tag from the L2 tag RAM 201 and, when the result is a cache hit, reads out the data from the L2 data RAM 202 and transfers it through the data output buffer 34 to the processor core 5. If searching for the tag and the results is a cache miss, the pipeline 70 registers the request in the MIB 160 and issues a load request to the memory controller 400.

Receiving the load request, the memory controller 400 fetches the data from the main storage device 420, returns a data response to the MIB 160, and transmits the data to the data input buffer 32. Receiving the data response, the MIB 160 updates the L2 tag RAM and updates the L2 data RAM at the priority unit and furthermore requests a data response to the processor core 5. The L1 cache controller 16 of the processor core 5 receiving the data response transfers data to the execution unit 14 and registers the data at the L1 cache memory 18.

Figure 2:
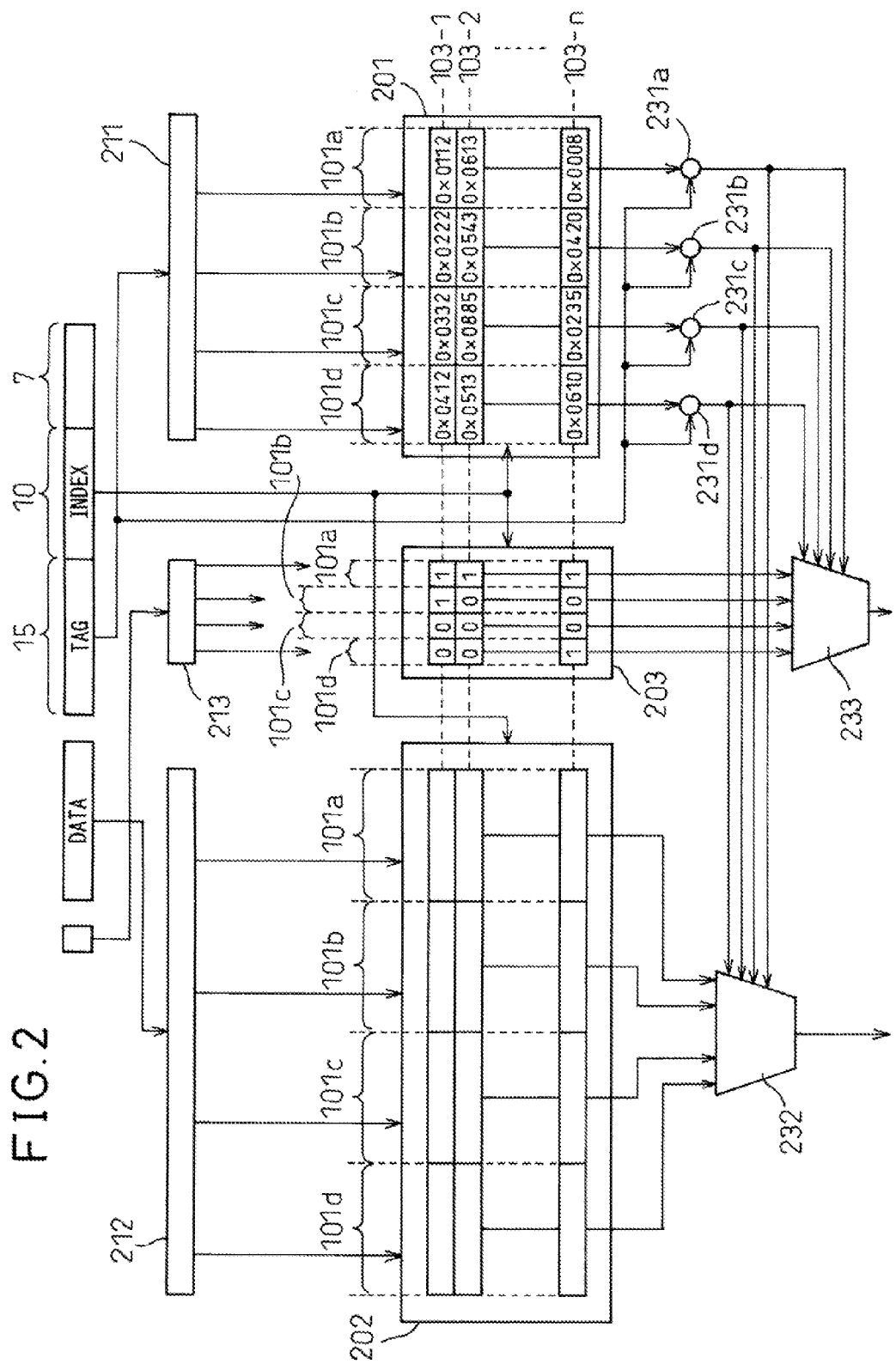
FIG. 2 is a block diagram illustrating an example of a cache memory.

FIG. 2 is a block diagram illustrating an example of a cache memory. The L2 cache memory 100 illustrated in FIG. 2 is a 4-way set associative type cache memory. As illustrated in FIG. 2, the L2 cache memory 100 is configured by a plurality of sets. Each set is managed divided into cache ways 101a to 101d.

The L2 cache memory 100 illustrated in FIG. 2 manages the data held by the L2 cache memory 100 in units called "cache lines" 103-1 to 103-n. Each cache line is identified by an index address included in a data access request 350 from the processor core 5. A data access request 350 includes for example a load request and a prefetch request.

The L2 cache memory 100 includes an L2 tag RAM 201, an L2 data RAM 202, a sector ID RAM 221, write amplifiers 211 to 213, comparison circuits 231a to 231d, and selection circuits 232 and 233. The L2 tag RAM 201, the L2 data RAM 202, and the sector ID RAM 221 respectively have pluralities of entries corresponding to cache lines 103-1 to 103-n. In each entry of the L2 tag RAM 201, part of the physical address called a "tag" is held. The L2 cache memory 100 has four ways, so the degree of associativity is "4". One index address is used to identify four cache lines and four tags.

In each entry of an L2 tag RAM 201, a tag is held. A tag is written by a write amplifier 211. In each entry of the L2 data RAM 202, data identified by a tag is held. In each entry of the L2 data RAM 202, data is written by the write amplifier 212. In each entry of the sector ID RAM 221, a sector ID is held. In each entry of the sector ID RAM 221, a "sector ID" is written by the write amplifier 213. A sector ID is comprised of 1 bit or 2 bits. In the case of 1 bit, the value of the sector ID may be either the value of "0" or "1". In the case of 2 bits, the sector ID may take three values of "0" to "2 or four values of "0" to "3".

The comparison circuits 231a to 231d are circuits that compare parts of the physical addresses supplied from the TLB and the tags read out from the L2 data RAM to judge cache misses or cache hits. The comparison circuits 231a to 231d are linked with the cache ways 101a to 101d. The comparison circuits 231a to 231d with cache hits output 4-bit hit way signals where only the outputs of the comparison circuits where matches of the tags are detected become "1".

In the case of a cache miss, an operation is performed to fetch the data from a physical address on the main storage device. An example of the operation for fetching in the case of a cache miss will be explained later using FIG. 4.

When a cache hit occurs and the memory access request is a read request, at the L2 data RAM 202, the values of the data of the four cache lines corresponding to each cache way are read out to the selection circuit 232 from the cache lines designated by the index. Further, due to the hit way signals output from the four comparison circuits, the data values of the cache lines corresponding to any of the cache ways corresponding to comparison circuits where tag matches are detected are selected and output.

When a cache hit occurs and the memory access request is a write request, at the L2 data RAM 202, the data designated by the memory access request is written to the block of the cache ways instructed by the hit way signals among the four cache lines corresponding to each cache way in the cache lines designated by the index.

Due to the above configuration, when the address to be accessed is specified by a data access request 350, one of the cache lines 103-1 to 103-n is designated by the index. As a result, the cache lines corresponding to the index are read out from the cache ways 101a to 101d, and the tags of the cache lines specified by the index are respectively input to the comparison circuits 231a to 231d.

The cache lines 103-1 to 103-n detect a match or mismatch of the tags of the cache lines read out and the tags included in the data access request 350. A cache line read out at a comparison circuit at which a tag match is detected is said to be a "cache hit". Data of that cache line is read out from the selection circuit 232.

Figure 3:
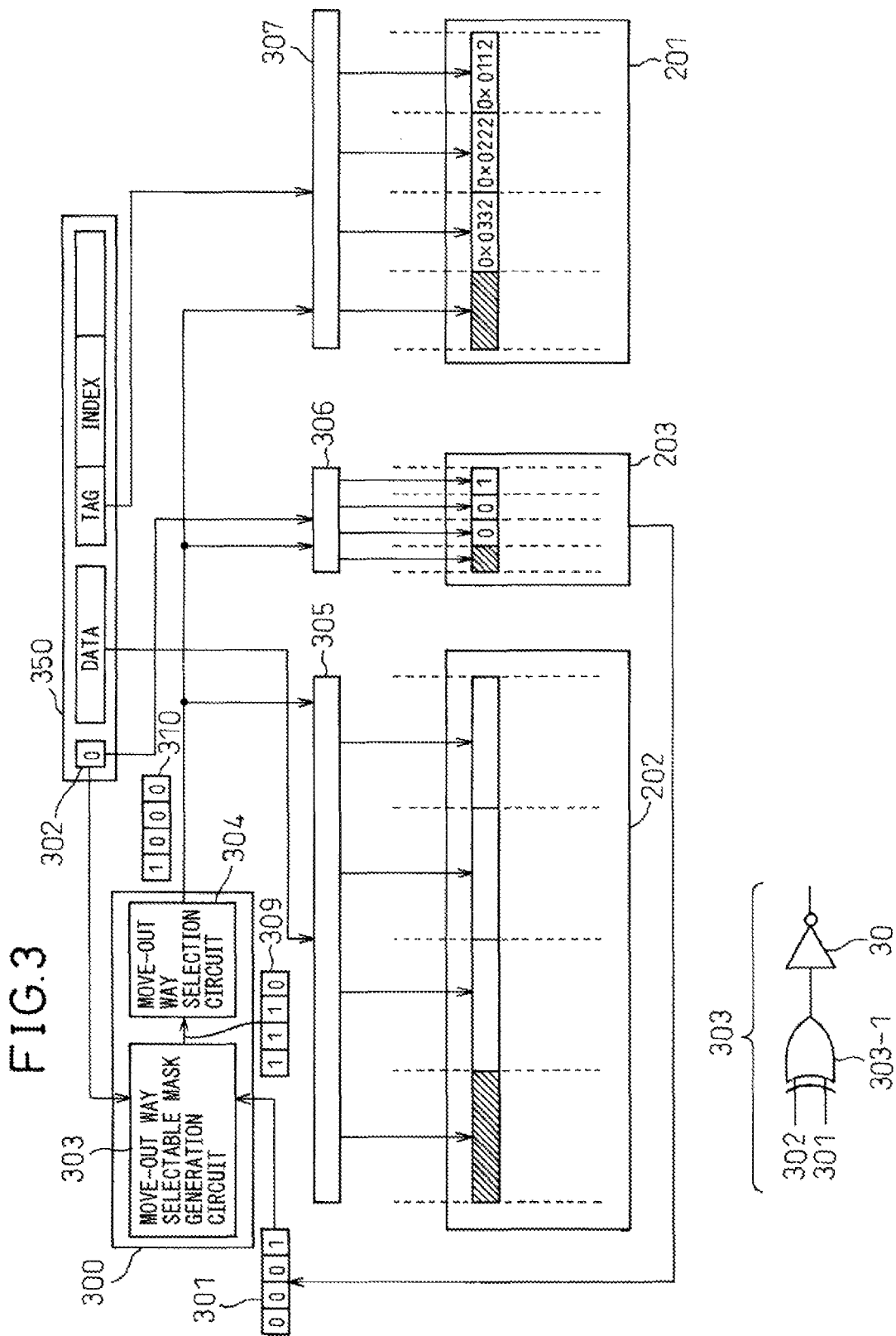
FIG. 3 is a block diagram illustrating an example of the configuration of a move-out way control circuit.

FIG. 3 is a block diagram illustrating an example of the configuration of a move-out way control circuit. A move-out way control circuit 300 determines which way should be moved out among four cache ways 101 having cache lines designated by the index when a cache miss occurs.

At FIG. 3, first, a 1-bit sector ID 302 defined for controlling the move-out of data in the L2 cache memory 100 is added to the data access request 350. A sector ID is attribute information used for identifying data to be moved out in move-out processing of cache lines. For example, when performing move-out processing for cache lines of the L2 cache memory, the processor core 5 moves out cache lines with a sector ID of "1" and does not move out cache lines with a sector ID of "0". In this way, the sector ID is used for control of whether to move out cache lines having that sector ID.

A data access request 350 includes a sector ID. The index in the data access request 350 designates line numbers of the L2 tag RAM 201, L2 data RAM 202, and sector ID RAM 203. The move-out way selectable mask generation circuit 303 receives the 4-bit sector ID 301 and the 1-bit sector ID 302 added to the data access request 350 from the line number of the sector ID RAM 203 designated by the index.

Further, the move-out way selectable mask generation circuit 303 is comprised of an exclusive OR circuit (XOR) 303-1 and an inverter (INV) 303-2. The move-out way selectable mask generation circuit 303 executes exclusive NOR processing between the bits of the 1-bit sector ID 302 from the data access request 350 and the 4-bit sector ID 301 from the sector ID RAM 203.

Due to this, a move-out way candidate 309 where only the bit positions having bit values of the same sector ID as the bit values of the sector ID 302 (in the example of FIG. 3, "0") added to the data access request 350 become the value 1 is output. For example, when "0001" is read out as the 4-bit sector ID 301 from the sector ID RAM 203 of FIG. 2, by having the parts of the value "0" in it become "1" due to the match and the part of the value "1" becoming "0" due to the mismatch, "1110" is output as the 4-bit move-out way candidate 309.

This move-out way candidate 309 indicates that the cache way 101 corresponding to the bit position having the value 1 is the way which should be moved out by the data access request 350.

Further, the move-out way selection circuit 304 selects one of the ways corresponding to the bit position of the value "1" in the move-out way candidate 309 in accordance with an LRU algorithm etc. The move-out way selection circuit 304 outputs a 4-bit move-out way signal 310 (in the example of FIG. 3, "1000") with only bit positions corresponding to the selected way becoming "1".

The move-out way signal 310 is input to the selectors 305, 306, and 307 and makes the selectors select the ways corresponding to the bit positions of the values "1" in the 4-bit data of the move-out way signal 310.

The selectors 305, 306, and 307 output data, tags, and sector IDs corresponding to the bit positions of the values "1" in the 4-bit data of the move-out way signal 310 in the L2 data RAM 202, L2 tag RAM 201, and sector ID RAM 203.

Further, the index in the data access request 350 designates line numbers in the L2 data RAM 202, L2 tag RAM 201, and sector ID RAM 203. Due to this, at the L2 data RAM 202, L2 tag RAM 201, and sector ID RAM 203, the data, tags, and sector IDs are written at the selected cache lines 103 (hatched part) of the designated line numbers.

Due to the above-mentioned function, for a data access request 350 for data not expelled from the L2 cache memory 100, the processor core 5 accesses the memory by designating for example the sector ID=1 at the data access request 350. In the expulsion processing, the cache line of the sector ID=1 can be used so as not to be expelled. After this, even if executing a data access request 350 for data which may be immediately expelled from the L2 cache memory 100, the processor core 5 accesses the memory by designating for example the sector ID=0 at the data access request 350.

Due to this, the data of the data access request 350 executed with the sector ID=0 is moved out only at a cache way with the sector ID=0 stored in the L2 cache memory 100 at the time of a cache miss. In this case, the data written in the L2 cache memory 100 together with the sector ID=1 is not moved out and expelled.

In this way, what data to expel can be controlled by the sector ID attached to the data access request 350. This data access request 350 may be an access instruction which the user designates by a program or may be a request which specific hardware of the system automatically issues to the L2 cache memory 100.

Figure 4:
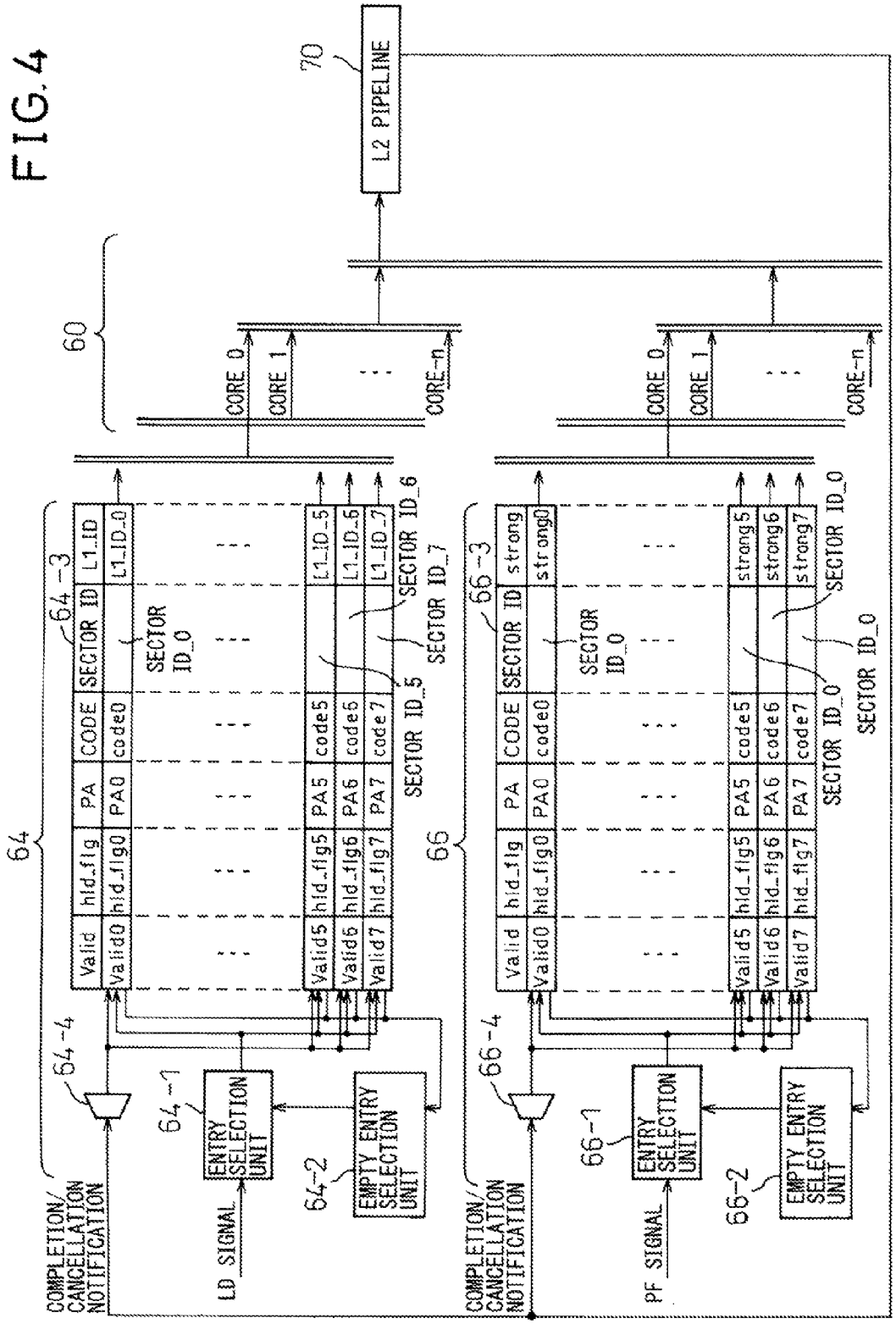
FIG. 4 is a block diagram illustrating an example of an LD port and PF port.

FIG. 4 is a block diagram illustrating an example of an LD port and PF port. An LD port 64 has an entry selection unit 64-1, an empty entry selection unit 64-2, an LD signal storage circuit 64-3, and a decoder 64-4.

The LD signal storage circuit 64-3 has an entry configuration registering a validity bit (Valid), a physical address (PA) of a request address, a code (CODE), a sector ID, L1 identification information (L1 ID), and a hold flag (hld flg).

The L1 identification number is an identification number for identifying a load request generated at the L1 cache controller 16.

The code (CODE) is information specifying the signal type. The code specifies either a "shared type instruction prefetch request", "shared type data prefetch request", or "exclusive type data prefetch request". A "shared type instruction prefetch request" is a signal type requesting that an instruction fetched by a prefetch be held at the L2 cache memory 100 at "shared type" status information fetched at another processor core. A "shared type data prefetch request" is a signal type requesting that data fetched by a prefetch be held at the L2 cache memory 100 at "shared type" status information fetched by another processor core. An "exclusive type data prefetch request" is a signal type requesting that data fetched at a prefetch be held in an exclusive type state, that is, a state where the requesting processor core can change the data.

When the entry selection unit 64-1 receives an LD signal, it registers an LD signal for the entry notified by the empty entry selection unit 64-2. The decoder 64-4 receives from the pipeline 70 a completion notification or cancellation notification specifying the port and entry ID. The decoder 64-4, when receiving a completion notification, sets the validity bit of the entry specified by the completion notification to "invalid". The decoder 64-4, when receiving a cancellation notification, sets the hold flag on the entry specified by the cancellation notification to "valid". The empty entry selection unit searches for an entry where the validity bit (Valid) is "invalid" and notifies it to the entry selection unit 64-1.

The LD port 64 receives an LD signal from the processor core 5, registers it at an empty entry, and inputs a load request to the pipeline 70 in the order of reception of the request. The pipeline 70, at a final stage, supplies a completion notification or cancellation notification to the LD port 64. In the case of completion, it releases the entry, while in the case of cancellation, it again inputs the load request to the pipeline 70.

The PF port 66 has an entry selection unit 66-1, an empty entry selection unit 66-2, a PF signal storage circuit 66-3, and a decoder 66-4.

The PF signal storage circuit 66-3 holds a PF signal having a data structure including a validity bit (Valid), physical address (PA), data code (CODE), sector ID, and "strong" information (strong) at a plurality of entries. With a prefetch request, if the deterioration in terms of performance can be ignored even if the request is not processed, the processor core can operate normally. However, in the present embodiment, when the prefetch request designates a sector ID, if the prefetch request is not validly processed, an unnecessary L2 cache miss occurs. An example where a prefetch request is not validly processed will be explained later using FIG. 11A and FIG. 11B.

Figure 11A:
FIG. 11A is a diagram illustrating, for each way, the state of a cache line on which sector ID move-out processing is performed.

The strong information specifies whether the prefetch request must necessarily be executed or if the routine may be ended without executing it. When the prefetch request includes strong information of "1", it means that the prefetch request is a strong prefetch request which must be processed. Accordingly, the software run by the processor core 5 is coded envisioning that data is written into the L2 cache memory 100 by execution of a prefetch request when the strong information of the prefetch request is "1". For this reason, when the strong information of the prefetch request is "1", if the prefetch request is not suitably executed, an unnecessary L2 cache miss such as illustrated in FIG. 11A and FIG. 11B occurs.

On the other hand, when the prefetch request includes strong information of "0", it means that the prefetch request is not a strong prefetch request which must necessarily be processed. Accordingly, the software run by the processor core 5 is coded so that an L2 cache miss as illustrated in FIG. 11A and FIG. 11B does not occur when the strong information of a prefetch request is "0". In this way, the strong information gives flexibility to the method of use of a prefetch request in preparing software.

The operations of the other components of the PF port 66 are the same as with the corresponding components of the LD port 64, so explanations may be omitted.

Figure 5A:
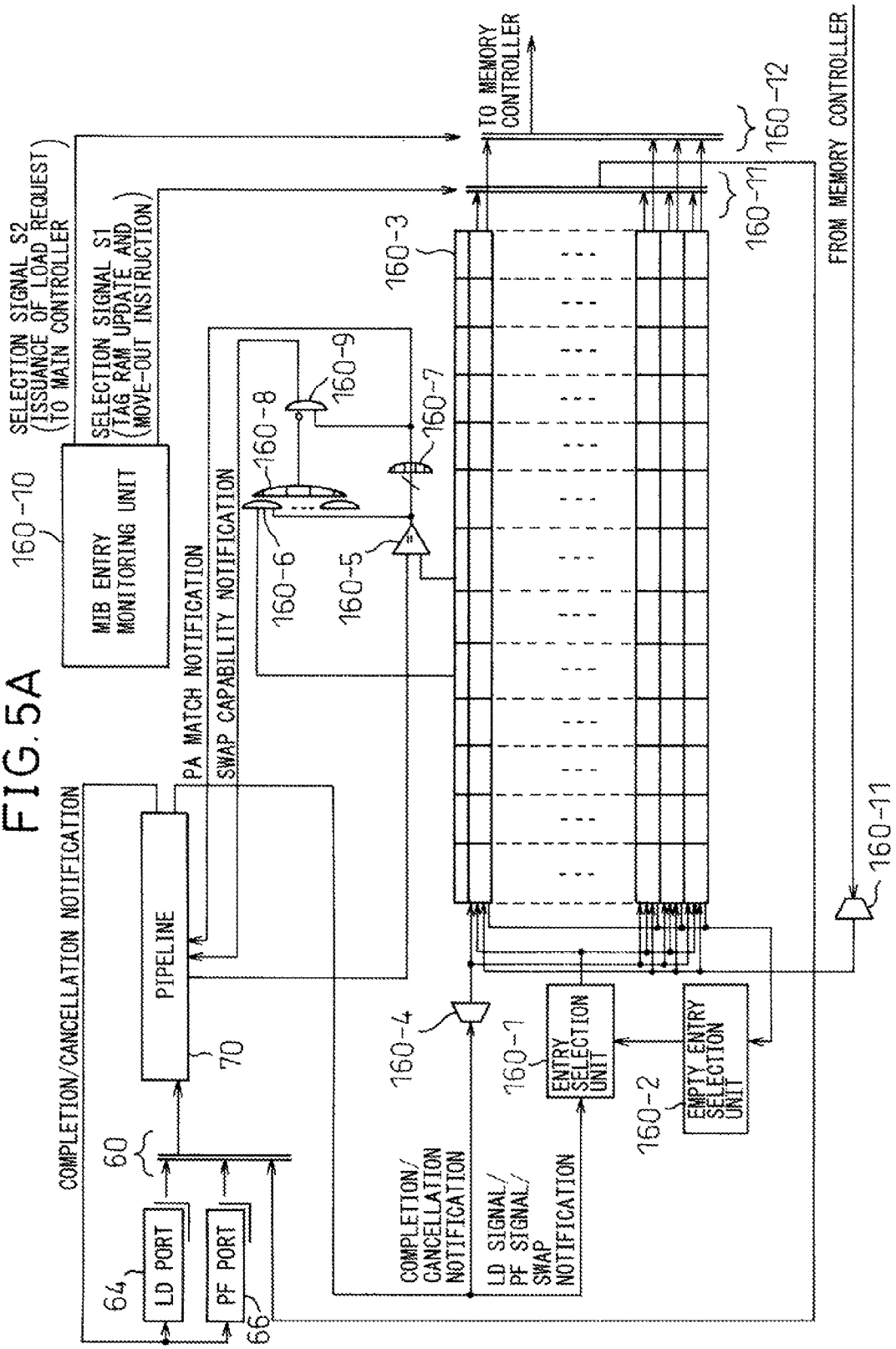
FIG. 5A is a block diagram illustrating an example of an MIB.

FIG. 5A is a block diagram illustrating an example of an MIB, and FIG. 5B is a data structure diagram illustrating an example of an MIB. The MIB 160 has an entry selection unit 160-1, an empty entry selection unit 160-2, a buffer circuit 160-3, decoders 160-4 and 160-11, a PA comparison unit 160-5, AND circuits 160-6 and 160-9, and OR circuits 160-7 and 160-8. The MIB 160 further has an MIB entry monitoring unit 160-10 and selection circuits 160-12 and 160-13.

The buffer circuit 160-3 has an entry configuration registering a validity bit (Valid), physical address (PA), code (CODE), PF number, sector ID, L1 identification information (L1-ID), hold flag (hld flg), and core ID. The buffer circuit 160-3 further has an entry configuration registering way identification information (WAY ID), a main controller request issuance flag (Req_issued), a replacement completion (RPL_cplt), and a memory controller response reception (MS_cplt).

The physical address (PA) and the code (CODE) ID are generated at the processor core 5 and are registered through the MI or PF port at the MIB 160 by acquisition of the initial entry.

The PF number is generated at the pipeline 70 and is registered at the MIB 160 by the fetching of the initial entry or LD swap. Note that, processing for updating the sector ID of a preceding load request held at the MIB 160 by a sector ID of a succeeding prefetch request is called an "LD swap". Further, processing for updating the sector ID of a preceding prefetch request held at the MIB 160 by a sector ID of a succeeding prefetch request is called a "PF swap". An "LD swap" will be explained later using FIG. 6, while a "PF swap" will be explained later using FIG. 7.

The sector ID is generated at the processor core 5 and is registered through the LD port 64 or PF port 66 at the MIB 160 by the fetching of the initial entry or LD swap or PF swap.

The L1 identification number is generated at the processor core 5 and is registered through the LD port 64 at the MIB 160 by the fetching of the initial entry or LD swap.

The core ID is generated at the pipeline 70 and registered at the MIB 160 by fetching of the initial entry or an LD swap.

The way ID is generated at the L2 tag RAM 201 and registered at the MIB 160 by fetching of the initial entry. In this way, at the time of an LD swap, the L1 identification information, core ID, and furthermore sector ID relating to a load request are updated, but at the time of a PF swap, only the sector ID is updated.

When the entry selection unit 160-1 receives an LD signal or PF signal or update information, it registers the LD signal or PF signal or update information for the entry notified by the empty entry selection unit 160-2. The decoder 160-4 receives from the pipeline 70 a completion notification or cancellation notification specifying the LD port 64 or PF port 66 and the entry ID. The decoder 160-4, when receiving a completion notification, sets the validity bit of the entry specified by the completion notification to "invalid".

The decoder 160-4, when receiving a cancellation notification, sets the hold flag of the entry specified by the cancellation notification to "valid". The empty entry selection unit 160-2 searches for an entry where the validity bit (Valid) is "invalid" and notifies it to the entry selection unit 160-1. The decoder 160-11 receives a memory response signal indicating to read out data from the memory controller 400 and sets the memory controller response reception (MS_cplt) flag of the entry specified by the memory response signal to "1".

The PA comparison unit 160-5 compares the PA of the data covered by a load request or prefetch request being processed at the pipeline 70 and the PA of data held at the MIB 160 and judges if the two data match. If the two data match, the PA comparison unit 160-5 supplies "1" to the AND circuits 160-6 and OR circuit 160-7. When the OR circuit 160-7 receives a signal of "1" from the PA comparison unit 160-5, it supplies a PA match notification to the pipeline 70. The AND circuits 160-6 are provided in a number corresponding to the entries. When the PAs match and there is a data response from the memory controller 400, the OR circuit 160-8 supplies "1" to the AND circuit 160-9.

The AND circuit 160-9 operates to not supply a swap capability notification to the pipeline 70 when there is an entry with a matching address and there is a data response from the memory controller 400. The pipeline 70 operates so as to supply an LD swap or PF swap signal to the MIB 160 when the swap capability notification is "1". Accordingly, even when there was a preceding request for the same address at the MIB 160 and the pipeline 70 has already obtained data from the main storage device 420, the pipeline 70 cannot supply an LD swap or PF swap signal to the MIB 160. An LD swap or PF swap operation is not performed in this way so as, as explained later in FIG. 9, to eliminate the time by which a succeeding request wastefully occupies the LD port or PF port and to prevent a delay in the transmission of data read out by a preceding request to the processor core.

The MIB 160 receives an LD signal or PF signal or an update notification from the pipeline 70 and registers the load request or prefetch request in an empty entry. It takes out the requests from the buffer circuit 160-3 in the order received and inputs an Mload request to the memory controller 400. The pipeline 70 supplies a completion notification or cancellation notification to the LD port 64 at the final stage. In the case of completion, it releases the entry from the LD port 64 or PF port 66.

The MIB entry monitoring unit 160-10 operates to supply a selection signal S1 to the selection circuit 160-11 when the validity bit (Valid) is "1" and the main controller request issuance flag (Req_issued) is "0". The MIB entry monitoring unit 160-10 operates to supply a selection signal S2 to the selection circuit 160-13 when the validity bit (Valid) and replacement completion (RPL_cplt) and memory controller response reception (MS_cplt) are "1" and the hold flag (hld flg) is "0".

The selection circuit 160-12, when receiving a selection signal S1, supplies the priority control circuit 60 with a move-out processing instruction for moving out the entry as a condition for generating the selection signal S1. The move out circuit 160-13, when receiving the selection signal S2, operates to supply the memory controller 400 with an Mload request.

FIG. 6 to FIG. 8 are flow diagrams illustrating an example of pipeline processing. A pipeline 70 executes processing in accordance with a priority order determined by the priority control circuit 60. The priority order, for each type of request, is, for example, "updating of tag RAM and sector ID RAM after fetching data">"move-out of L2 cache line">"load request"> and "prefetch request". The "updating of tag RAM and sector ID RAM after fetching data" and "move-out of L2 cache line" are processings by which the entries of the LD port 64, PF port 66, and MIB 160 are released. By performing the entry release processing with priority, the possibility of deadlock of the L2 cache memory is lightened.

The pipeline 70 processes a request divided into process steps called "stages". The pipeline 70 is processing performing different stages in the same processing time synchronized with a clock. The pipeline 70 is connected with the L2 tag RAM 201, the priority control circuit 60, and other resources for executing the processing steps of the different stages and executes the processing steps by supplying signals to or receiving them from the resources.

The stages of the pipeline 70 are an operation request readout stage (RR), a priority determination stage (PD), a PA input stage (PI), a tag readout stage (TR), a cache hit detection stage (CD), and a request processing judgment stage (RP).

Using FIG. 6, one example of load request processing by the pipeline 70 will be explained. At request readout stage, the pipeline 70 reads out a request held at the LD port 64 or PF port 66. At the priority determination stage, the pipeline 70 supplies the read request to the priority control circuit 60 and receives a request determined by the priority control circuit 60 by a predetermined priority order.

At the PA input stage, the pipeline 70 inputs the physical address of data to be accessed into the L2 tag RAM 201. At the tag readout stage, the pipeline 70 reads out a tag from the L2 tag RAM 201. At the cache hit detection stage, the pipeline 70 detects a cache hit or cache miss from the L2 cache memory 100.

At the request processing judgment stage, processing is performed in accordance with the results of detection of the cache hit detection stage.

In the case of cache miss detection, the pipeline 70 inputs a load request to the entry of the MIB 160 and supplies a completion notification to the LD port 64.

In the case of cache hit detection, the pipeline 70 reads out the data from the L2 data RAM 202 and supplies a completion notification to the LD port 64.

The pipeline 70 inputs the load request to the MIB 160, then, when receiving a "PA match notification" from the MIB 160, supplies a "swap" notification updating the different information between the prefetch request input to the MIB 160 preceding that and the succeeding load request. The different information means for example the sector ID.

Two or more prefetch requests or load requests with matching physical addresses held at the MIB 160 are called a "PA match".

The pipeline 70 inputs a load request to the MIB 160, then receives a "PA match notification" from the MIB 160. If there is no difference between the requests held by the MIB 160, the pipeline 70 supplies a completion notification to the MIB 160 and supplies a cancellation notification to the LD port 64. The MIB 160, when receiving a completion notification, releases the entry specified by the completion notification.

When otherwise a load request is not processed, the pipeline 70 supplies a cancellation notification to the MIB 160.

Using FIG. 7, an example of prefetch request processing by a pipeline will be explained. The prefetch request processing is the same as a load request processing except for the request processing judgment stage. Accordingly, only the request processing judgment stage will be explained.

In the case of detection of a cache miss, the pipeline 70 inputs a prefetch request to an entry of the MIB 160 and supplies a completion notification to the LD port 64.

In the case of detection of a cache hit, the pipeline 70 reads out data from the L2 data RAM 202 and supplies a completion notification to the LD port 64.

When the pipeline 70 inputs a prefetch request to the MIB 160, then receives a "PA match notification" from the MIB 160, it supplies a "swap" notification for updating the different information between a preceding prefetch request input at the MIB 160 and a succeeding prefetch request.

The pipeline 70 inputs a prefetch request to the MIB 160, then receives a "PA match notification" from the MIB 160. If there is no difference between requests held by the MIB 160, the pipeline 70 supplies a completion notification to the MIB 160 and supplies a cancellation notification to the LD port 64. The MIB 160, when receiving a completion notification, releases the entry specified by the completion notification.

When the prefetch request is otherwise not processed, the pipeline 70 supplies a cancellation notification to the MIB 160.

Using FIG. 8, an example of L2 move-out request processing by the pipeline will be explained. The L2 move-out request processing is the same as the load request processing except for the request processing judgment stage. Accordingly, only the request processing judgment stage will be explained.

When there is no line for move out in the L2 cache memory 100, the pipeline 70 supplies a completion notification to the MO port 62.

When there is a line for move out in the L2 cache memory 100, the pipeline 70 performs writeback processing for data fetched from the main storage device 420 for the line for move-out or processing to invalidate the line and supplies a completion notification to the MO port 62.

When the move-out request is not processed, the pipeline 70 cancels the move-out request processing and supplies a cancellation notification to the MO port 62.

Figure 9:
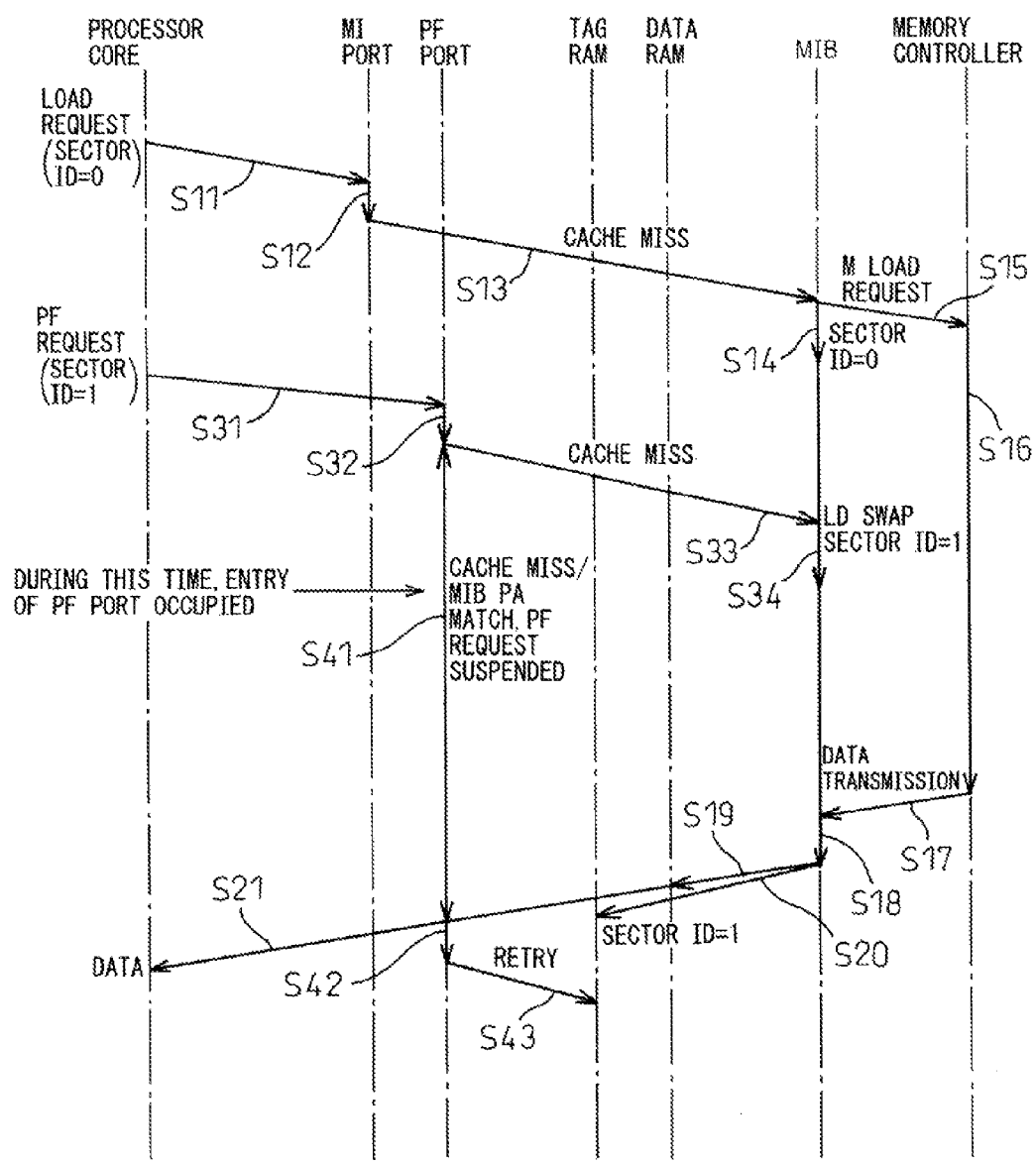
FIG. 9 is a sequence diagram illustrating an example of the case of a processor core issuing a load request and prefetch request to the same address.

FIG. 9 is a view illustrating an example of the sequence of processing when a processor core issues a load request and prefetch request for the same address. FIG. 10 is a time chart of the processing when a processor core issues a load request and prefetch request for the same address. In FIG. 9 and FIG. 10, the processings illustrated by the same reference numerals perform the same operations.

The processor core 5 outputs a load request including a "sector ID=0" to the LD port 64 (S11). The LD port 64 holds the load request (S12). When the load request held by the LD port 64 is input to the pipeline 70 by the priority control circuit 60, the pipeline 70 detects a cache miss and registers the load request in the MIB 160 (S13). The sector ID=0 included in the load request is registered in an entry of the MIB 160 (S14). The MIB 160 supplies an Mload request signal to the memory controller 400 (S15). The memory controller 400 fetches data of the physical address specified by the Mload request from the main storage device 420 (S16).

Furthermore, the processor core 5 supplies a load request to the LD port 64, then supplies a prefetch request including the "sector ID=1" for the same address as the load request to the PF port 66 (S31). The PF port 66 holds the prefetch request (S32). The prefetch request held by the PF port 66 is input to the pipeline 70 by the priority control circuit 60. Further, the pipeline 70 detects a cache miss and detects that the preceding load request at the MIB 160 is a request for the same address (S33). The pipeline 70 performs an LD swap for the sector ID of the load request by a "sector ID=1" included in the prefetch request (S34). Furthermore, the pipeline 70 supplies a completion notification to the PF port 66. Note that when the strong information of the prefetch request is "0" and a prefetch need not be performed, at S34, an LD swap is not performed, and the pipeline 70 outputs a completion notification to the PF port.

The preceding load request is for the same address, so the load request can be used to fetch the data covered from the main storage device. For this reason, as illustrated in S41, the succeeding prefetch request is canceled. Further, the canceled prefetch request can register the sector ID=1 at the tag RAM by retry processing (S42) after the tag RAM and data RAM after updated by the preceding load request (S43). However, at S41, the canceled prefetch request occupies the entry of the PF port. For this reason, as illustrated by S33, it is possible to perform a PF swap and complete a succeeding prefetch request so as to eliminate the unnecessary occupancy of the PF port.

When data is sent from the memory controller 400 (S17), the MIB 160 supplies a move-out instruction to the pipeline 70 (S18). The pipeline 70 receiving a move-out instruction from the MIB 160 registers the data fetched from the main storage device 420 in the L2 data RAM 202 (S19) and registers the tag and sector ID in the L2 tag RAM 201 (S20). The data input buffer 32 transmits the data fetched from the main storage device 420 to the processor core 5 (S21).

FIG. 11A and FIG. 11B are diagrams illustrating, for each way, the state of a cache line on which sector ID move-out processing is performed, as illustrated in FIG. 9 and FIG. 10. There are eight number of ways of the L2 cache memory illustrated in FIG. 11A and FIG. 11B. Further, the processor core issues a prefetch request or load request to the L2 cache memory so that the number of ways where sector ID=0 always becomes "1".

The state 701 illustrates the state of the cache line before the move-out processing due to a cache miss. The LRU 711 at the state 701 becomes the state of "A<B<C<D<E<F<G<H (A being the oldest and H being the newest)".

The state 702 illustrates the state of the cache line when the L2 cache receives a load request to load the address X by a sector ID=0, then a cache miss occurs, so an address A of the same index as the address X is moved out and the address X is registered. The LRU 712 at the state 702 becomes the state of "B<C<D<E<F<G<H<X", and the address X registered at the WAY0 becomes the latest state at the LRU.

The state 703 is the state of the cache line after the "LD swap" illustrated at S34 of FIG. 9 and FIG. 10. It illustrates the state where the L2 cache receives a prefetch request for prefetching the address X by a sector ID=1 and the address A is registered by the sector ID=0, so is replaced with the address X of the sector ID=1. The LRU 713 at the state 703 becomes "B<C<D<E<F<G<H<X" or the same as the LRU 712 at the state 702.

The state 704 is the state where the L2 cache receives a prefetch request for prefetching the address Y by a sector ID=0, then a cache miss occurs, so an address Y of the same index as the address Y is moved out and the address Y is registered. At the point of time when receiving a prefetch request for prefetching the address Y by a sector ID=0, all ways of the same index as the address Y are registered by the sector ID=1. There are no blocks registered by the sector ID=0. For this reason, due to the LRU algorithm, the oldest block that is, the address B (WAY=1), is selected for replacement and the address Y is registered. Accordingly, the LRU 714 of the state 704 is "C<D<E<F<G<H<X<Y".

The state 705 is the state when the L2 cache receives a load request for loading the address X by a sector ID=1 and a cache hit occurs. The data of the address X was used, so at the LRU 715, the address X becomes the newest. Accordingly, the LRU 715 of the state 705 is "C<D<E<F<G<H<Y<X".

In this way, due to an "LD swap", the sector ID=1 is suitably updated by the preceding prefetch request, so the processor core hits the cache with a load request for loading by the sector ID=1.

On the other hand, the states 723 to 725 illustrate the cases where a succeeding prefetch request is completed without the "LD swap" illustrated at FIG. 9 and FIG. 10 being performed.

The state 723 illustrates the state where a prefetch request for prefetching the address X by the sector ID=1 has been completed, so the L2 cache does not have the address A registered by the sector ID=0, and therefore this is replaced by the address X of the sector ID=0. The LRU 733 of the state 723 becomes "B<C<D<E<F<G<H<X".

At the state 724, the processor core issues a prefetch request for prefetching the address Y by the sector ID=0. At this point of time, the only block registered by the sector ID=0 among the same indexes as the address Y is X, so the address X (WAY=0) is selected for move out and the address Y is registered at the WAY=0. At the time of move-out processing of X, the L2 cache controller requests processing for invalidation of the same address of the L1 cache of the processor core. The LRU 734 at the state 724 becomes "B<C<D<E<F<G<H<Y".

At the state 725, the processor core issues a load request for loading the address X at the sector ID=1. Contrary to what the software executed by the processor core envisions, the address X becomes a cache miss at the L1 cache. The LRU 735 of the state 725 is no different from the LRU 734.

In this way, if the sector ID is not suitably processed by the L2 cache controller contrary to what the software envisions, a drop in performance of the processor 10 is invited. On the other hand, as illustrated by the state 703, by causing an "LD swap", unnecessary cache misses are prevented and no drop in performance of the processor 10 is invited.

In the example of FIG. 9 and FIG. 10, the case is illustrated where the preceding request is a load request and the succeeding request is a prefetch request, but a PF swap or LD swap may be performed even for other cases of a preceding request and a succeeding request.

FIG. 12 is a diagram illustrating an example of the possibility of a swap in the case where a plurality of requests are issued for the same address. The first row of Table 600 illustrates that when the preceding request is a prefetch request and the succeeding request is a prefetch, a swap is possible. The entry of the MIB after the swap is the prefetch request both for the preceding and succeeding requests, so the prefetch request is held.

The second row of Table 600 illustrates that when the preceding request is a prefetch request and the succeeding request is a load request, a swap is possible. However, in this case, the entry of the MIB after the swap is the load request. This is because a load request differs from a prefetch request in that L1 identification information, that is, unique identification information, is given for each load request. Therefore, unlike a prefetch request, erasure, invalidation, or initialization of the content of the entry is not possible until being returned to the processor core.

The third row of Table 600 is the example explained in FIG. 9 and FIG. 10, so an explanation may be omitted.

The fourth row of Table 600 illustrates that when both the preceding and succeeding requests are load requests, a swap is not possible. This is because load requests respectively have unique L1 identification information, so even if swapping them, discard, erasure, invalidation, or initialization of the content of the entry is not possible for a succeeding load request.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A processor comprises:
   a processing unit that has a first storage unit;
   a second storage unit that holds part of the data held by the first storage unit;
   a third storage unit that receives from the processing unit a first request for reading out data from the second storage unit and including first attribute information for obtaining a first logical value and a second request for reading out data from the second storage unit and including second attribute information for obtaining a second logical value different from the first logical value and that holds the first request until receiving a completion notification of the first request or holds the second request until receiving a completion notification of the second request, the first and second attribute information including LRU (Least recently used) information with sector IDs; and
   a control unit that receives a prefetch request as the second request following the first request from the third storage unit and, replaces the first attribute information of the first request by the second attribute information when data of the addresses corresponding to the first and second request are not in the second storage unit, and supplies the completion notification for the second request to the first storage unit.

2. The processor according to claim 1, wherein the control unit fetches data corresponding to the address of the first request from a main storage device, then registers the second attribute information and the data corresponding to the address of the first request in the second storage unit.

3. A method of control of a processor that has a first storage unit included in a processing unit, a second storage unit at a lower level than the first storage unit, a third storage unit arranged between the first storage unit and the second storage unit, and a control unit that controls input/output of data to and from the second storage unit and the third storage unit,
   the method of control of a processor comprising:
   receiving a first request for reading out data from the second storage unit and including first attribute information for obtaining a first logical value by the third storage unit, the first attribute information including LRU information with a sector ID;
   receiving a prefetch request as a second request following the first request, for reading out data from the second storage unit and including second attribute information for obtaining a second logical value different from the first logical value after the step of receiving the first request by the third storage unit, the second attribute information including LRU information with a sector ID;
   replacing first attribute information of the first request with the second attribute information when data of the addresses corresponding to the first and second request is not in the second storage unit by the control unit; and
   erasing the second request from the third storage unit by the control unit.

4. The method of control of a processor according to claim 3, wherein
   the second storage unit is connected to a main storage device, and
   the method further has a step of having the control unit fetch data of the address corresponding to the first request from the main storage device, then register the second attribute information and the data in the second storage unit.

* * * * *